Figure 1:
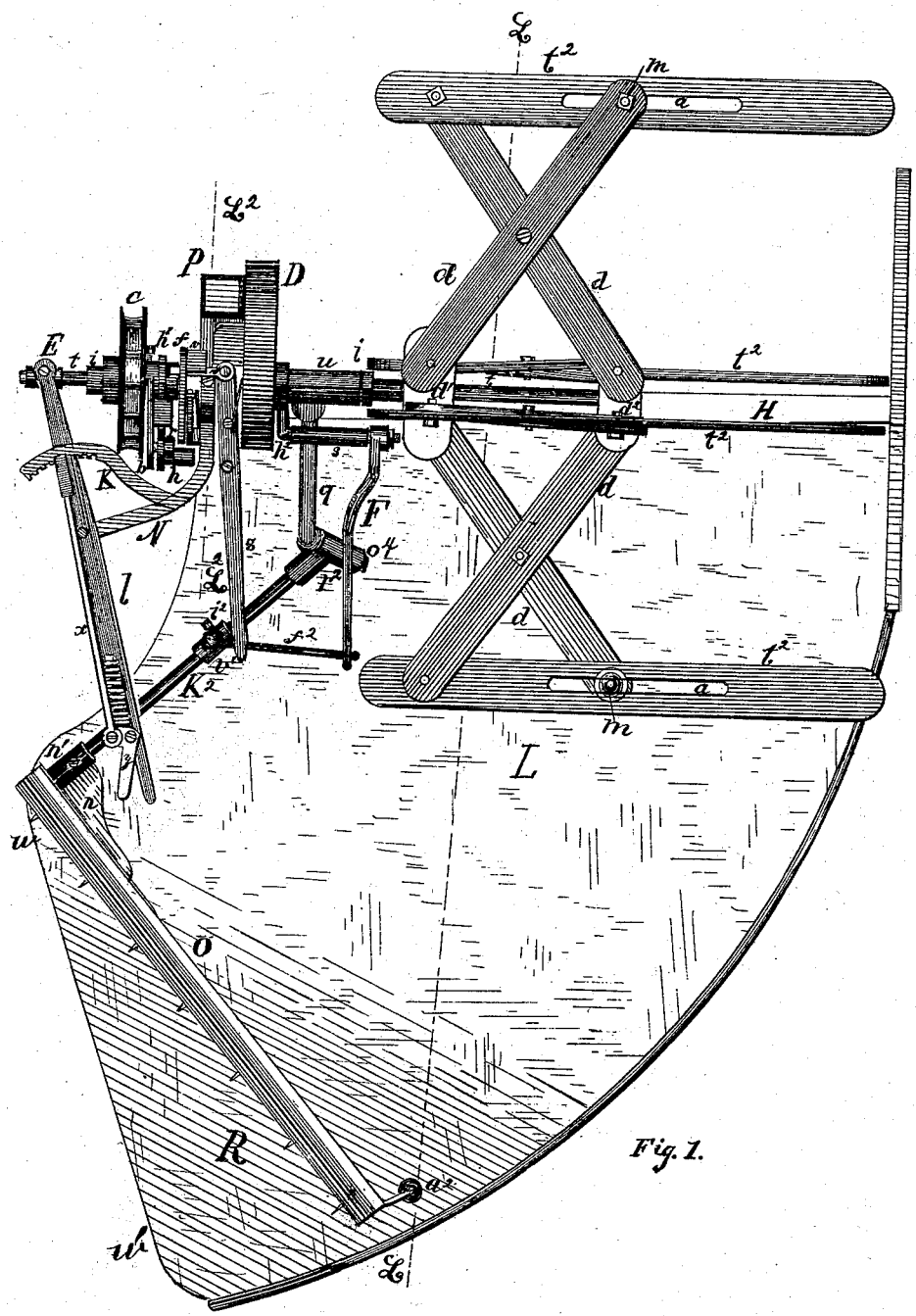

H. H. BRIDENTHAL, Jr.
HARVESTER-RAKE.

No. 187,700. Patented Feb. 27, 1877.

Witnesses,

Inventor.

H. H. BRIDENTHAL, Jr.
HARVESTER-RAKE.
No. 187,700. 2 Sheets—Sheet 2. Patented Feb. 27, 1877.
Fig. III.
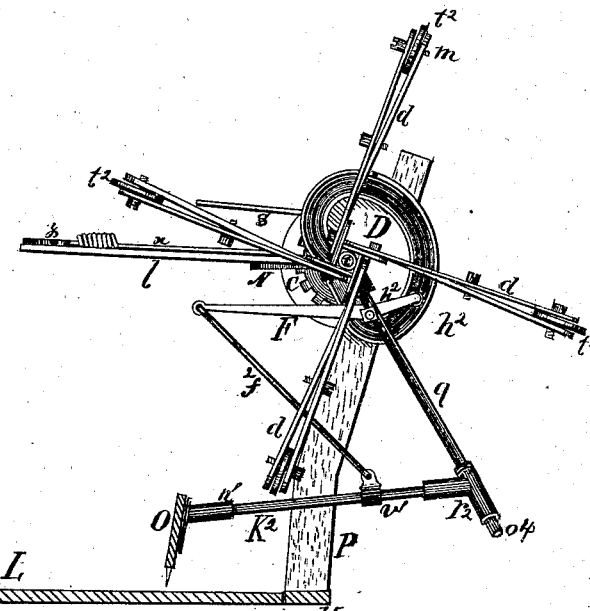
Fig. II.
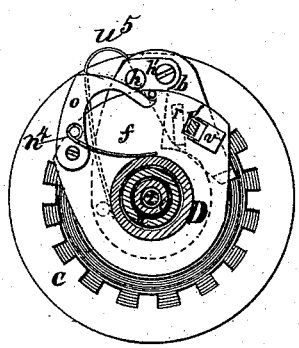
Fig. IV.
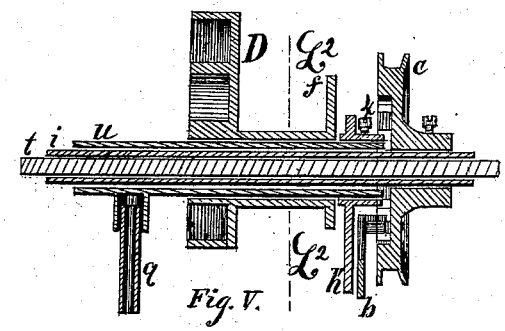
Fig. V.
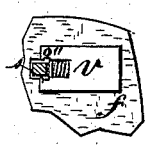
Fig. VI.
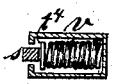
Fig. VII.
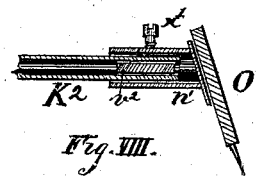
Fig. VIII.
Witnesses.
D. K. Shirey,
C. A. Shirey
Inventor.
H. H. Bridenthal, Jr.
N. PETERS, PHOTO-LITHOGRAPHER, WASHINGTON, D. C.

UNITED STATES PATENT OFFICE.

HARRY H. BRIDENTHAL, JR., OF LATROBE, PENNSYLVANIA.

IMPROVEMENT IN HARVESTER-RAKES.

Specification forming part of Letters Patent No. 187,700, dated February 27, 1877; application filed January 22, 1876.

*To all whom it may concern:*

Be it known that I, HARRY H. BRIDENTHAL, Jr., of Latrobe, in the county of Westmoreland and State of Pennsylvania, have invented certain new and useful Improvements in Harvester-Rakes; and I do hereby declare the following to be a clear and exact description thereof, that will enable those skilled in the art to which it appertains to make and use the same, reference being had to the drawings forming part of this specification.

My invention relates to that class of harvester-rakes which are connected with and driven by the devices which drive the overhanging reel, and which, when started by the attendant, make one revolution, rake the gavel to the stubble, stop automatically, and remain at rest until again started, and to the construction of an expanding reel.

The objects of my invention are to improve the construction of harvester-rakes, making them more effective in operation, causing the grain to be deposited on the ground in straight close gavels, and out of the way of the team and machine on the next round; to adapt them to be used in connection with machines having the cutter-bar either in front or behind the driving-wheels, and to diminish their weight, and thus increase their durability and general utility; and it consists in novel construction and arrangement of arms, cam-groove plate, and link operating the raking-head; in an automatic stop device and buffer-spring, whereby the rake is automatically stopped and retained at any point of its revolution, and in combination of tubular and sliding reel-shafts, crossed diagonal reel-arms, segmental notched arm, and adjusting-lever, as will be hereinafter more definitely explained and specifically claimed.

To enable those skilled in the art to make and use my machine, I will describe it with reference to the drawing, in which—

Figure 1 is a complete top view thereof. Fig. 2 is a side elevation of the same, the grain-platform being shown partly in section through the line Z Z, Fig. 1. Fig. 3 is a detached sectional view of the sliding connection between the reel-arms and the slotted floats. Fig. 4 is a detached vertical sectional view of the stop and locking mechanisms, taken through the line $Z^1 Z^2$, Figs. 1 and 5. Fig. 5 is a forward vertical sectional view of the cam-plate and connections, showing the construction of the sleeves and shaft operating the reel and rake. Fig. 6 is a detached view of the buffer-spring box. Fig. 7 is a sectional view of the same, and Fig. 8 is a detail vertical sectional view of the adjustable connection between the raking-head and operating-arm.

Similar letters of reference, where they occur in different figures, refer to like parts of the machine in all of the drawings.

L, Fig. 1, is the platform; P, the reel-post, and H represents the finger-bar of my machine, and they are constructed in the usual well-known manner, except that the rear end of the platform L is somewhat narrower than the length of the raking-head, because of the angular movement of the said raking-head as it sweeps the gavel off, and the rear corner is raised or curved upward at R, causing the surface of the platform to assume a slightly-twisted form relative to the path of the raking-head, which is made to conform therewith as it moves rearward along the same. The purposes of this construction will be hereinafter explained.

To the post P is secured the cam-grooved plate D, which is provided with suitable lugs for the purpose, and with a rather large sleeve-bearing for the reception of the hollow rake-shaft $u$. On the opposite end of the said sleeve-bearing from the cam-plate is formed the projection $f$, for the purpose of connecting therewith the stop and locking mechanisms.

In consequence of the particular shape of the before-mentioned cam-groove plate and sleeve, and to secure greater strength, they should be formed in one piece, and made of malleable cast-iron.

To the outer end of the rake-shaft $u$ is secured a short arm, $h^1$, which is provided with a collar, which fits over the end of the before-mentioned shaft $u$, and is secured thereto by means of one or more set-screws, in such a manner as to be readily adjusted to any position around the same, for the purpose of enabling the rake to be stopped at any point of its revolution, as may be desired. The internal notched driving-chain pulley C is secured to the end of the hollow reel-shaft $i$, which revolves within the tubular rake-shaft $u$, and to the opposite end is secured the reel-spider $d^2$, and a suitable collar to keep it in place. To the outer end of the arm $h^1$ is pivoted the pawl $b$, a stud upon the free end of which engages the teeth or notches in the driving-wheel C, where it is held by the spring $u^5$, except when disengaged by the lip $r$ thereon striking against the stop-bolt $s$, which projects through a slot in the projection $f$. The opposite end of the said stop-bolt $s$ is pivoted to the end of the lever $g$, which is secured to a fulcrum on a projection attached to the back of the cam-plate D, and is held in the position shown in Fig. 1 by means of a suitable spring. The lip $r$ on the pawl $b$ rests against the arm $h^1$ when the said pawl is disengaged from the drive-wheel, thus serving as a stop for the rake-gearing.

For the purpose of deadening or neutralizing the concussion consequent upon the moving parts of the rake-gearing being stopped suddenly, I have provided a buffer-spring within the box $v$, behind the stop-bolt $s$, as shown in Figs. 4, 6, and 7. The buffer-spring box $v$ is formed upon the projection $f$, partly over the stop-bolt slot, and is slotted at one end to correspond therewith, and near the slotted end is formed the notches $o''$ in the cover $v$, and which extend to the interior thereof, for the purpose of inserting a small plate, $t^4$, which is of proper size to fit loosely within the box, where it covers the end of the buffer-spring, and against which the stop-bolt $s$ rests.

The aforesaid buffer-spring being placed within the box $v$ endwise through the slotted end thereof, the end forced down past the notches $o''$, the plate $t^4$ is then inserted from the side through the said notches $o''$, and also forced against the spring. The stop-bolt is then placed within its slot, where it holds the plate $t^4$ within the box and past the inserting-notches. The said plate and spring are thus retained permanently in place.

To the arm $f$ is pivoted the eccentric ratchet $o$, which has for its purpose to prevent the rake from moving backward, or rebounding when stopped by the bolt $s$, by rising behind the stud $h$ upon the arm $h^1$, which carries the said stud over the ratchet, depressing it until past, when a spring, $n^4$, raises it to the position shown in Fig. 4.

By this construction the operator may, by means of the lever $g$, withdraw the stop-bolt $s$, thus releasing the pawl $b$, which is, by means of the spring $u^5$, caused to engage within a notch in the driving wheel or pulley C, thus causing the arm $h^1$ and the rake to make one revolution, when the lip $r$ strikes against the before-mentioned stop-bolt, thus withdrawing the pawl and stopping the rake until again started, as described.

Near the inner end of the rake-shaft $u$ is connected the arm $q$, the lower or opposite end of which is curved outward, as shown in Fig. 1, and provided with suitable collars, thus forming the spindle $o^4$, about which works the sleeve $r^2$, to which is angularly connected the secondary arm $K^2$, which is, in turn, connected at right angles with raking-head O.

The sleeve S is connected to the arm $q$ a short distance from and parallel with the rake-shaft $u$, and it forms a bearing for the rock-shaft $h^2$, on one end of which is connected an arm, which carries a friction-roller, moving within the groove in the cam-groove plate D, and to the opposite end is connected the arm F, which is, in turn, connected, by means of the link-rod $f^2$, to the adjustable eye-collar $v'$ upon the secondary arm K.

The cam-groove in the plate D is of such shape as to cause the raking head O to move nearly horizontally over the platform from the finger-bar back to the rear end.

The particular angles of the spindle $o^4$ and the sleeve $r$ relative, respectively, to the arm $q$ and the secondary arm K cause the raking-head to swing around parallel with the platform. The angle of the spindle $o^4$ will vary somewhat, as, when it is desired to make the platform longer rearward, for front-cut machines, the said angle will be more than one hundred and thirty degrees; whereas, in other classes of machines, where it is not desirable to extend the platform, the angle may be less. The angles of the arm K and sleeve $r^2$ will also vary somewhat with the length of the arm used.

By this construction the raking-head, on leaving the rear end of the platform, is carried upward over the top of the reel, and is at the same time folded in parallel with the floats of the said reel, and in coming around passes closely over the finger-bar against the butts of the grain, pushing it rearward along the platform, and having nearly reached the rear end of the said platform, the end $w$ of the raking-head will be considerably in advance of the opposite end relative to the edge $w$ $w'$ of the platform; hence the grain at $w$ will be delivered to the ground in advance of that which is delivered from the point $w'$. The inner end $w$ of the rake having reached the edge of the platform, the arms $q$ and $K^2$ will then have come nearly parallel, thus bringing the raking-head around parallel with the edge of the platform, thus delivering the grain gradually from the forward to the rear elevated corner of the said platform. The machine will, in the meantime, move forward some distance, and carry that part of the gavel delivered from the elevated part $w'$ forward and upon that which leaves the platform at $w$, thus crowding the gavel into a close pile.

The outer end of the raking-head O is provided with a caster-wheel, which has for its purpose to prevent the end of said head from catching upon the outer side by rolling along the same when sweeping over the platform. The eye-collar $v'$ fits loosely over the arm K, and is provided with a set-screw, thus providing means for adjusting it along the said arm, for the purpose of adjusting the raking-head relative to the platform L.

For the purpose of diminishing the weight of the moving parts of the machine as far as possible, I form the arms $q$ and K of tubes, and for this purpose use in their construction ordinary gas-pipe, about one and a half inch in diameter, all of the couplings being also formed hollow. I am therefore enabled to secure sufficient stability with but little weight.

The raking-head O is secured to the end of the arm K by means of a short tube having a suitable head formed thereon for the connection of the raking-head, and is of sufficient caliber to fit over the end of the before-mentioned arm, where it is secured by one or more set-screws, thus providing means of adjusting the head O relative to the grain-platform, and to prevent the said set-screws from indenting the end of the arm a short plug is placed therein, as shown in Fig. 8.

Within the before-mentioned tubular reel-strap $i$ is placed a secondary shaft, $t$, which moves freely therein longitudinally, and its outer end is provided with a spider corresponding with a spider on the end of the tubular shaft $i$. To a pair of leaves of the said spiders is secured, by means of screw-bolts or other suitable means, a pair crossed arms, $d$, to the opposite ends of which are secured the reel-floats $t^2$, the inner ends being secured, by means of simple stud-bolts, as is each pair of crossed arms $d$, near the middle, where they cross each other. The opposite ends of the floats $t^2$ are secured to their respective arms by means of stud-bolts, which play within the slots $a$ in the said reel-floats.

By this construction it is evident that when the shaft $t$ is moved longitudinally so as to bring the spiders nearer together, the floats will be moved farther from the center, and *vis-a-vis*, thus bringing them nearer to or farther from the finger-bar, as may be desired. The outer ends of the floats $t^2$ are secured to the arms by means of the bolts $m$, which pass through the said arms, and over which are placed two large washers, $u^4$, between which is placed a short piece of tube, $g$, which is a little longer than the thickness of the float $t^2$, and of sufficient size so as to fit loosely within the slot $a$ in the floats, which are placed over the said tube and between the washers. A nut, $g^2$, draws the washers and tube tightly against the arm $d$, thus forming a strong and durable connection. To the sleeve-bearing of the rake-shaft $u$ is pivoted the arm N by means of a clevis formed at one end, one branch of which is pivoted to the top and the other beneath the said bearing, in a manner so as to allow the arm to swing laterally a short distance. The opposite end of the lever N is curved around the driving-wheel C, where it is pivoted to the lever $l$, the forward end of which is, by means of a clevis and collar, pivoted to the end of the sliding shaft $t$. K is a toothed segmental branch from the arm N, and, by means of the rod $x$ and hand-lever $y$, serves to lock the lever $l$ and reel in position. By this construction the operator can, by means of the lever $l$, adjust the reel to any size he may desire while the machine is in operation.

Having thus described my invention, I claim—

1. The combination of the shafts $i\ u$, wheel C, arm $h^1$, pawl $b$, stop-bolt $s$, and the lever $g$, substantially as and for the purposes herein specified.

2. The combination of the cam-groove plate D, shaft $u$, arm $q$, with the oblique spindle $o^4$ formed thereon, secondary arm $K^2$, rock-shaft F, and the link $f^2$, substantially as and for the purposes herein specified.

3. The combination of the disk $f$, cam-pawl $o$, stud $h$, and the arm $h^1$, substantially as and for the purposes herein specified.

4. In an intermittently-revolving harvester-rake, the operating-arm $h^1$, provided with the set-screws 4, for the purpose of circumferential adjustment relative to the rake-arm $q$, substantially as and for the purposes set forth.

5. In an intermittently-revolving harvester-rake, the stop $s$, provided with the spring $v$, or equivalent, substantially as and for the purposes herein specified.

6. In an intermittently-revolving harvester-rake gear, the spring-box V, notches $o^4$, and the plate $t^4$, these members all constructed substantially in the manner and for the purposes set forth.

7. The cam-plate D, disk $f$, and the spring-box $v$, these members all formed in one piece, substantially as and for the purposes herein specified.

8. The hubs $d^2$, pivoted crossed arms $d$, and the floats $t^2$, these members all arranged substantially in the manner and for the purposes herein shown and described.

9. The reel-adjusting lever $l$, swinging fulcrum-arm N, segment K, pawl and hand-lever $y$, these members all arranged substantially in the manner and for the purposes shown and described.

10. The combination of the crossed arm $d$, bolt $m$, washers $u^4$, tube $g$, and the slotted reel-float $t^2$, substantially as and for the purposes herein specified.

H. H. BRIDENTHAL, Jr.

Witnesses:
D. K. SHIREY,
C. A. SHIREY.